455-612
11/24/87   XR   4,709,413
AU 263   EX

United States Patent [19]
Forrest et al.

[11] Patent Number: 4,709,413
[45] Date of Patent: * Nov. 24, 1987

[54] BIDIRECTIONAL FIBER OPTIC SYSTEMS

[75] Inventors: Stephen R. Forrest, Chatham; Robert A. Lieberman, New Providence, both of N.J.; Richard L. Panock, Lexington, Mass.

[73] Assignee: American Telephone and Telegraph Company, AT&T Bell Laboratories, Murray Hill, N.J.

[*] Notice: The portion of the term of this patent subsequent to Jan. 8, 2002 has been disclaimed.

[21] Appl. No.: 744,465

[22] Filed: Jun. 13, 1985

Related U.S. Application Data

[60] Continuation-in-part of Ser. No. 653,885, Sep. 25, 1984, Pat. No. 4,577,209, which is a division of Ser. No. 416,467, Sep. 10, 1982, Pat. No. 4,493,113.

[51] Int. Cl.⁴ .................. H04B 9/00; C12M 1/34; A61B 5/02
[52] U.S. Cl. ................. 455/606; 455/612; 435/291; 128/667
[58] Field of Search ............ 455/619, 606, 607, 612; 435/808, 291; 128/667, 672, 673, 675

[56] References Cited

U.S. PATENT DOCUMENTS 3,267,932  8/1966  Valliere ..................... 128/675
4,210,029  7/1980  Porter ....................... 128/673
4,278,349  7/1981  Sander ........................ 356/44
4,357,106  11/1982 Tschirren .................... 356/44

OTHER PUBLICATIONS

"A Long Wavelength Annular $In_{0.53}Ga_{0.47}As$ p-i-n Photodetector", S. R. Forrest, IEEE Electron Device Letters, vol. EDL-3, No. 12, Dec. 1982, pp. 415–417.
"Process, Product, and Waste Stream Monitoring with Fiber Optics," F. P. Milanovich, ISA International Conference Preprint, pp. 407–418 (1983).

Primary Examiner—Robert L. Griffin
Assistant Examiner—Andrew J. Telesz, Jr.
Attorney, Agent, or Firm—Lester H. Birnbaum

[57] ABSTRACT

A bidirectional fiber optic system is described in which at one terminal the output radiation of a light source (LED or semiconductor laser) is coupled through a small diameter hole in the active area of a photodiode into the core of a larger diameter transmission fiber. On the other hand, radiation propagating through the fiber in the opposite direction exits from the fiber with a large numerical aperture so that most of it is incident on the active area of the photodiode and little is lost through the hole. Also described are a number of photodiode configurations for use in such a system, as well as dual photodiodes to perform both signal detection and output monitoring functions. Further described are fiber optic sensing systems for monitoring such variables as blood pressure.

8 Claims, 11 Drawing Figures

SENSOR SPACING

BIDIRECTIONAL FIBER OPTIC SYSTEMS

CROSS-REFERENCE TO RELATED APPLICATIONS

This application is continuation-in-part of co-pending application Ser. No. 653,885, and now U.S. Pat. No. 577,209, filed Sept. 25, 1984 which, in turn, is a division of application Ser. No. 416,467, filed Sept. 10, 1982, and now U.S. Pat. No. 4,493,113.

BACKGROUND OF THE INVENTION

This invention relates to fiber optic systems and, more particularly, to bidirectional systems and to photodiodes for use in such systems.

Ridirectional transmission of optical signals over a fiber optic link between terminals at remote locations may be accomplished using a pair of fibers, one for transmission in each direction. Although this system configuration allows simultaneous transmission in both directions (full-duplex) and provides a high degree of isolation between the two transmission paths (or channels), it is disadvantageous because it duplicates transmitters and receivers for each fiber and consequently increases cost and consumes space.

The problem of duplicating fibers is alleviated in a wavelength-multiplexed, bidirectional system which utilizes only a single fiber and specially designed terminals. Unfortunately, the transceivers at either end of such a fiber optic link are not identical; that is, at one end the light source emits outgoing radiation at $\lambda_1$ and the photodetector detects incoming radiation at $\lambda_2 \neq \lambda_1$; whereas at the other end a different photodetector detects the radiation at $\lambda_1$ and a different light source emits radiation at $\lambda_2$. Another problem is the need for optical couplers at each end to connect both the light source and photodetector to the single fiber. Nevertheless, transmission at different wavelengths in each direction does provide good isolation between the two transmission channels.

An alternative prior art single-wavelength scheme sacrifices some of the isolation of the wavelength-multiplexed system for simplicity of terminal design. In this type of arrangement, transmission in both directions over a single fiber takes place at the same wavelength in each channel. Thus, the transceivers at each terminal can be identical. However, radiation transmitted in one direction can be reflected in the opposite direction by a number of light-reflecting interfaces in the system; e.g., at fiber connectors or at the remote photodetector. In a full-duplex system, the refleted radiation is a source of noise or crosstalk for radiation transmitted in the same direction. In addition, these system as currently proposed utilize some type of optical beam splitter to couple radiation from the fiber to the photodetector and from the light source to the fiber. Each pass of the radiation through the beam splitter entails at least a 3 dB loss; thus the total system loss (transmission plus reception) is at least 6 dB and in practice is 7-8 dB.

Bidirectional fiber optic systems may also be used for other applications where light transmission in one direction results from backscattering of the light in the opposite direction. For example, some types of blood pressure and temperature sensors employ a sensing element which reflects light from a fiber in accordance with the condition being monitored. Such systems usually employ a plurality of fibers to separately transmit incident and reflected beams (see, e.g., U. S. Pat. No. 3,249,105) or some means for separating the incident and reflected beams such as a beamsplitter or a perforated mirror (see, e.g., Milanovich et al, "Frocess, Product, and Waste Stream Monitoring With Fiber Optics,' *International Conference of the Instrument Society of America*, Oct. 1983, pp. 407–418). It would be advantageous to utilize a single fiber, but without the additional components required by most present systems to make the monitoring system as small and inexpensive as possible.

SUMMARY OF THE INVENTION

In accordance with an aspect of the invention, a bidirectional fiber optic system includes at one terminal a light source for generating outgoing radiation over the fiber and a photodiode for detecting backscattered radiation in the fiber. The photodiode has an active region on one side and a small diameter hole which extends through the active region from one side of the photodiode to the other. The fiber has a relatively large diameter, compared to that of the hole, and is positioned adjacent the active area on the one side of the photodiode. The outgoing radiation from the light source is coupled through the hole into the fiber for transmission to the opposite end of the fiber. In contrast, backscattered radiation in the fiber is incident primarily on the active region of the photodiode, with very little being coupled through the hole because of the small ratio of the area of the hole to that of the fiber core.

In accordance with one embodiment of the latter aspect of the invention, a sensing element is included on the opposite end of the fiber for reflecting the outgoing radiation back to the photodiode.

These embodiments of our invention, which do not require the use of beam splitters or similar couplers, posses the advantage of low loss, high optical isolation even though light of the same wavelength is transmitted in both directions, compactness, and relatively low cost.

BRIEF DESCRIPTION OF THE DRAWINGS

Our invention, together with its various features and advantages, can be readily understood from the following more detailed description taken in conjunction with the accompanying drawings, in which.

DETAILED DESCRIPTION—BIDIRECTIONAL SYSTEMS

Figure 1:
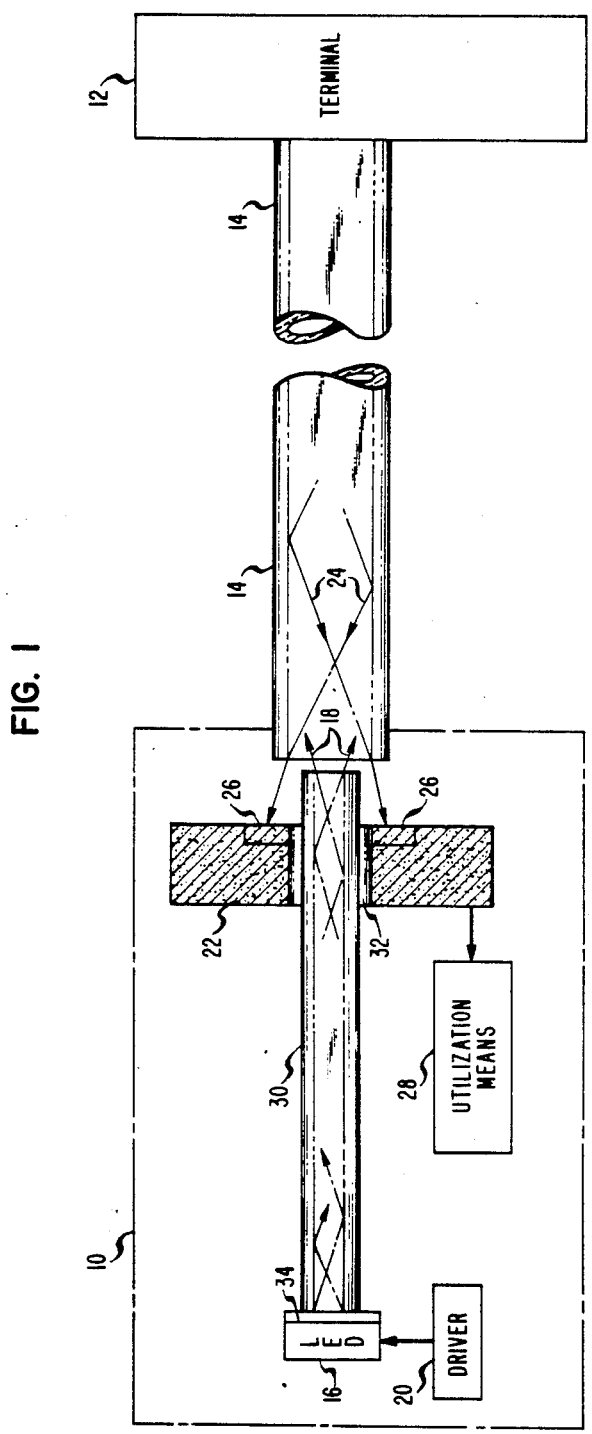
FIG. 1 is a schematic of a bidirectional, single-wavelength transmission system using surface-emitting LEDs in accordance with one embodiment of our invention.
Figure 2:
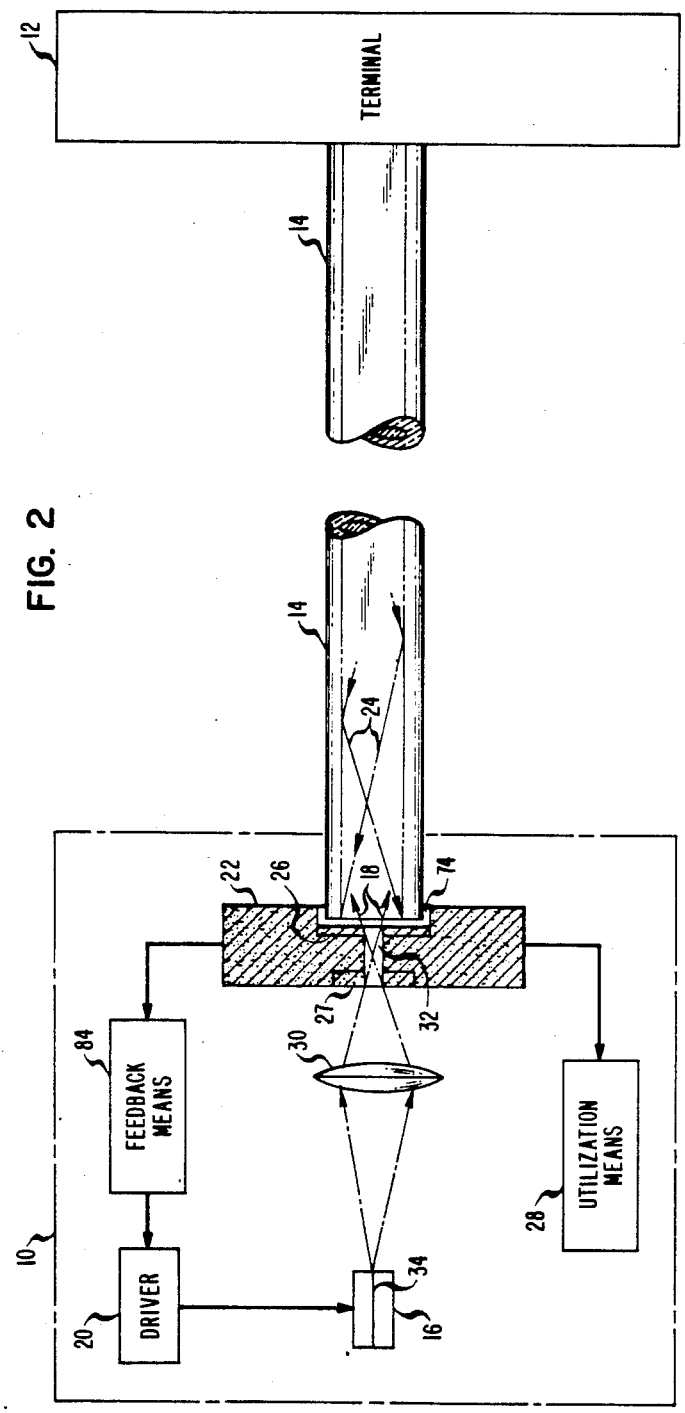
FIG. 2 is a schematic of a bidirectional, single-wavelength transmission system using edge-emitting LEDs or p-n junction lasers in accordance with another embodiment of our invention.

With reference now to FIGS. 1 and 2, there are schematically shown single-wavelength, bidirectional, fiber optic systems, each comprising a pair of terminals 10 and 12 linked together by a transmission fiber 14. Each of the terminals 10 and 12 constitutes a transceiver which is capable of generating outgoing radiation and detecting incoming radiation at the same wavelength. In general, each terminal comprises a light source 16 which generates outgoing radiation 18 in response to electronic signals provided by driver circuit 20. In addition, each terminal includes a photodiode 22 which detects incoming radiation 24 by absorbing it in the active region 26. The absorbed radiation generates electron-hole pairs which, when collected by a p-n junction, not shown, provide a photocurrent to utilization means 28.

The relative sizes of the active area 26, hole 32, and fiber 14 are mutually adapted to provide relatively low loss in the system and to reduce crosstalk between the transmission paths (channels) in each direction over fiber 14. In particular, the diameter of the active region 26 is preferably at least as large as a diameter of the core of transmission fiber 14, which is typically a large numerical aperture, multimode fiber. This relationship ensures that the incoming radiation 24, as it diverges from the end of fiber 14, is incident on the active area 26 of photodiode 22. To this end, the transmission fiber design and length should be adapted to ensure mode-mixing of the radiation propagating in it, thereby ensuring that the incoming radiation fills the fiber core as it exists from the fiber end onto the active area of the photodiode. These and other techniques for achieving mode-mixing are well known in the art.

In contrast, the diameter of the hole 32 in photodiode 22 is made to be much smaller than either the diameter of active area 26 or the diameter of the core of fiber 14 for two reasons. First, the outgoing radiation 18, which is coupled through hole 32, will be almost entirely captured by the larger diameter core of fiber 14, thereby reducing the optical losses for transmission from terminal 10 to terminal 12, and conversely. Secondly, the incoming radiation 24 will be incident primarily on the active region 26 of photodiode 22, and very little will be coupled through hole 32 to source 16, thereby reducing optical losses.

To this point, the detailed nature of the light source 16 and the coupling means 30 has not been specified nor have the details of the photodiode 22 been set forth. However, in FIG. 1, it is apparent that the light source 16 is schematically shown to be a surface-emitting LED (i.e., the direction of the outgoing radiation 18 is generally perpendicular to the plane of the p-n junction 34 of the LED). For this type of light source, the coupling means 30 is preferably a coupling fiber which has a small enough outside diameter to be inserted through hole 32 and a small diameter core consistent with the previously described desire to couple essentially all of the outgoing radiation 18 into fiber 14 but to couple very little of incoming radiation 24 through the hole 32 to the LED. The coupling fiber itself is illustratively depicted as being butt-coupled to both the LED and the transmission fiber.

The radiation coupled into the coupling fiber from the transmission fiber constitutes the system loss and is equal to the ratio of the area of the coupling fiber (including cladding) to the cross-sectional area of the transmission fiber core times the optical power coming out of the transmission fiber. For example, if the coupling fiber has a 50 $\mu$m core and a 125 $\mu$m O.D., and the transmission fiber has a 200 $\mu$m core and a 250 $\mu$m O.D., we obtain a geometrical loss of 39 percent, or a 2 dB loss in reception. There are two assumptions that have been made in this calculation. The first is that the radiation coming out of the transmission fiber has a uniform distribution. The second assumption is that the diameter of the coupling fiber used in calculating the loss is the total fiber O.D.; however, it is possible that some of the radiation injected into the cladding will not be trapped, and therefore will also be detected. Thus, in this system, there is essentially no loss in transmission, and only a geometrical loss in reception (e.g., 2 dB as above), which we expect to be much less than the 6 dB loss (at least) characteristic of prior art systems.

In contrast, the light source 16 of FIG. 2 is depicted as an edge-emitting LED or p-n junction laser in which the direction of propagation of the outgoing radiation 18 is generally parallel to the plane of p-n junction 34. In this case, because the output of a laser or edge-emitting LED is not nearly as divergent as that of a surface-emitting LED, a lens arrangement may be employed as the coupling means 30. For example, a suitable lens would be a half-pitch GRIN rod.

In general, the lens means 30 of FIG. 2 focuses the output of the light source 16 so that the focal point is approximately in the center of the hole 32, thereby reducing the aperturing effect of the hole. To this end, it is also preferable that the length of the hole 32 be as short as possible; hence, a second larger diameter hole 74 is axially aligned with hole 32. Hole 74 is adapted to receive the transmission fiber 14 which is positioned close to the active region 26. As a consequence, the incoming radiation 24 is incident primarily on the active region 26, whereas little of the outgoing radiation 18 is reflected from the fiber end onto the active region 26, thereby reducing crosstalk between the transmission channels.

For example, assume coupling means 30 is a half-pitch GRIN rod lens and that the source 16 is a stripe-geometry p-n junction laser. If the laser stripe dimension is about $1 \times 10$ $\mu$m and has some gain confinement in the stripe so that the spot size at the front mirror is smaller than the stripe dimension, then the laser spot can be imaged through a 15 $\mu$m diameter hole 32. This imaging would result in some loss due mostly to the large angular divergence of the laser beam relative to the numerical aperture of the GRIN rod lens (at least in one dimension), a loss present in all laser coupling systems. A 15 $\mu$m diameter hole used with 50 $\mu$m core transmission fiber still represents a geometric loss (hole area to fiber area) of only 9 percent (or $-0.41$ dB), which is smaller than what is now achieved with wavelength-division multiplexing systems. This scheme also represents what is probably the smallest achievable packaging of devices without having all the devices integrated on one substrate.

APERTURED PHOTODIODE STRUCTURES

Figure 3:
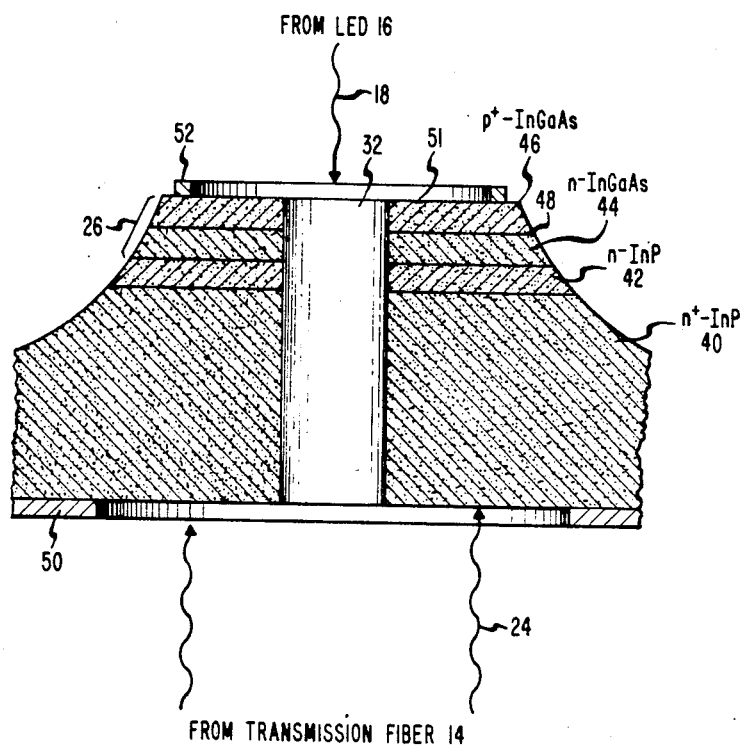
FIG. 3 is a cross-sectional view of a photodiode suitable for use in the systems of FIGS. 1 or 2 in accordance with another aspect of our invention.
Figure 4:
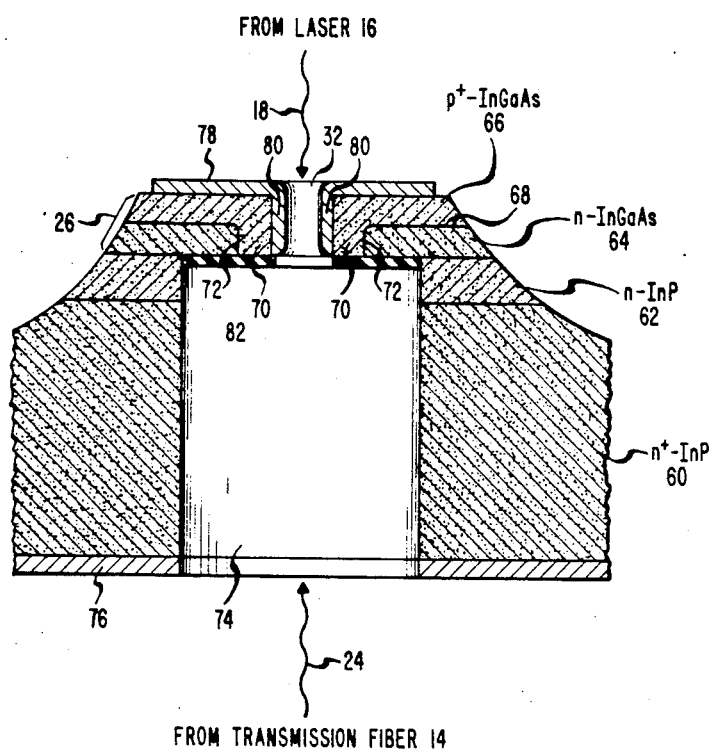
FIG. 4 is a cross-sectional view of another photodiode suitable for use in the system of FIG. 2 in accordance with the second aspect of our invention.

FIGS. 3 and 4 show apertured mesa photodiode structures suitable for use with the bidirectional, single-wavelength transmission systems of FIGS. 1 and 2, respectively. Note, however, that other diode geometries such as planar photodiodes can also be employed for these purposes.

The photodiode of FIG. 3 includes an n+-InP substrate 40 upon which are epitaxially grown an n-InP buffer layer 42 and an active region 26 including an n-InGaAs layer 44 and a p+-InGaAs layer 46. A p-n junction 48 is thus formed at the interface between layers 44 and 46. The materials described here are illustrative only but are particularly suitable for operation at wavelengths in the region of approximately 1.1–1.6 μm. However, InGaAsP and AlGaAs are typical substitute materials for use in the active region for diodes sensitive over other wavelength ranges. In this regard, the incoming radiation 24 from the transmission fiber 14 propagates through the transparent InP substrate 40 and buffer layer 42 but is absorbed in the InGaAs layers 44 and 46, thereby generating electron-hole pairs. The electron-hole pairs are separated by the p-n junction and generate a photocurrent in an external detecting circuit (not shown) which is connected across annular contacts 50 and 52. The latter contacts 50 and 52 are formed on substrate 40 and layer 46, respectively.

Alternatively, and particularly with regard to backscattering applications used at shorter wavelengths (less than 0.95 μm), the entire structure can be formed on moderately doped (less than $2 \times 10^{16}$ atoms/cm$^3$) InP substrates, thus avoiding the necessity of growing heteroepitaxial structures. For such structures, the substrate is not generally transparent to the incoming radiation, which should therefore be incident on the top surface, 51, in FIG. 3. The p-n junction would be formed by diffusion of an appropriate acceptor atom directly into the n-type substate. Of course, other substrate materials such as GaAs or GaSb could be used.

Hole 32 is formed in the photodiode so that it extends completely therethrough from one side to the other and, in particular, extends through the active region 26 of the photodiode including the p-n junction 48. The outgoing radiation 18 from the surface-emitting LED 16 of FIG. 1 is coupled through the hole 32 via the coupling fiber 30.

The hole 32 is formed in the photodiode by the photoelectrochemical etching process described in U.S. patent application Ser. No. 416,472, filed Sept. 10, 1982, now U.S. Pat. No. 4,414,066. The photodiode is described in more detail in Example I, infra.

The bidirectional system of FIG. 2 utilizes a photodiode of the type illustratively depicted in FIG. 4. This diode also includes an n+-InP substrate 60 on which are epitaxially grown an n-InP buffer layer 62 and an active region 26. The latter includes a pair of InGaAs layers 64 and 66 which have opposite conductivity types so as to form p-n junction 68 at the interface therebetween. After the hole 32 is formed through the photodiode using the previously identified photoelectrochemical etching process, the device is suitably masked so that only the region in the vicinity of the hole 32 is exposed. Then a p+-diffusion (e.g., a Zn-diffusion) is performed so as to convert the interior portion 70 of n-InGaAs layer 64 from n-type to p-type. In this manner, p-n junction 68 no longer intersects the inside walls of hole 32, but rather turns downwardly as shown by junction segment 72.

The narrow bore hole 32, through which the outgoing radiation 18 from the edge-emitting LED or a p-n junction laser is focused, is coaxial with a second larger diameter hole 74 which extends through the substrate to the vicinity of the p-n junction 68 and has a diameter adapted to receive the transmission fiber 14 of FIG. 2. Indeed, the downwardly directed segment 72 of the p-n junction intersects the bottom of the hole 74 which may be etched or otherwise formed by well-known techniques in the art. For example, hole 74 may be formed using a stop-etchant such as HCl which preferentially etches InP relative to InGaAs.

In operation, the incoming radiation 24 on the transmission fiber emanates from the end of the fiber and is absorbed in layers 64 and 66 where electron-hole pairs are generated and collected by the p-n junction 68–72. These collected carriers generate a photocurrent which flows between an annular contact 76 on the substrate 60 and an annular contact 78 on the top of the mesa. On the other hand, outgoing radiation 18 from the laser or edgeemitting LED is coupled through the hole 32 into the transmission fiber 14. However, because the focusing of radiation 18 through the hole 32 is imperfect, a portion of the radiation 18 will be incident on the side wall of the hole 32. As a consequence, if the p-n junction 68 were to intersect the side wall of hole 32, the absorption of that portion of the radiation would also generate a photocurrent and constitute crosstalk in the system. This problem is alleviated by the p+-diffusion step described earlier which ensures that the p-n junction 68 does not intersect the side wall of hole 32 but rather turns downwardly as shown by junction segments 72. Thus, the diffused portion 70 constitutes a region with essentially no electric field and hence a very small carrier collection efficiency. This configuration isolates the outgoing radiation 18 from the p-n junction.

Additional isolation can be provided by coating the inside of the hole 32 with metal layer 80 (which may be an extension of annular contact 78). It is well known in the art that the layer 80 can be formed by directional evaporation techniques exploring the relatively large aspect ratio of the hole 32 (which is typically 15 μm in diameter by 6 μm in depth). In fact, metal layer 80 provides most of the isolation. The curved p-n junction allows one to deposit the metal layer without shorting out the diode. Additional passivation can then be accomplished by deposition of a silicon nitride layer 82 on the bottom of the hole 74. Layer 82 should also be of the appropriate thickness to serve as an anti-reflection coating to the portion of InGaAs layer 64 exposed by hole 74 to increase diode efficiency.

DUAL PHOTODIODES

As shown in FIG. 2, when the light source 16 is a laser, it is common to provide a feedback circuit 84 for stabilizing the output of the laser with respect to long-term changes (e.g., aging) in its output characteristics (e.g., light intensity). Various schemes have been proposed in the prior art for monitoring either the back-mirror emission or the front-mirror emission scheme in which the photodiode 22 has a second active region 27 which samples the outgoing emission 18 and generates a feedback photocurrent. This current is supplied to a well-known feedback circuit 84 which, in turn, supplies an error signal to a laser driver circuit 20. The error signal is typically used to adjust the pre-bias of the laser in order to maintain constant the output light intensity.

Figure 5:
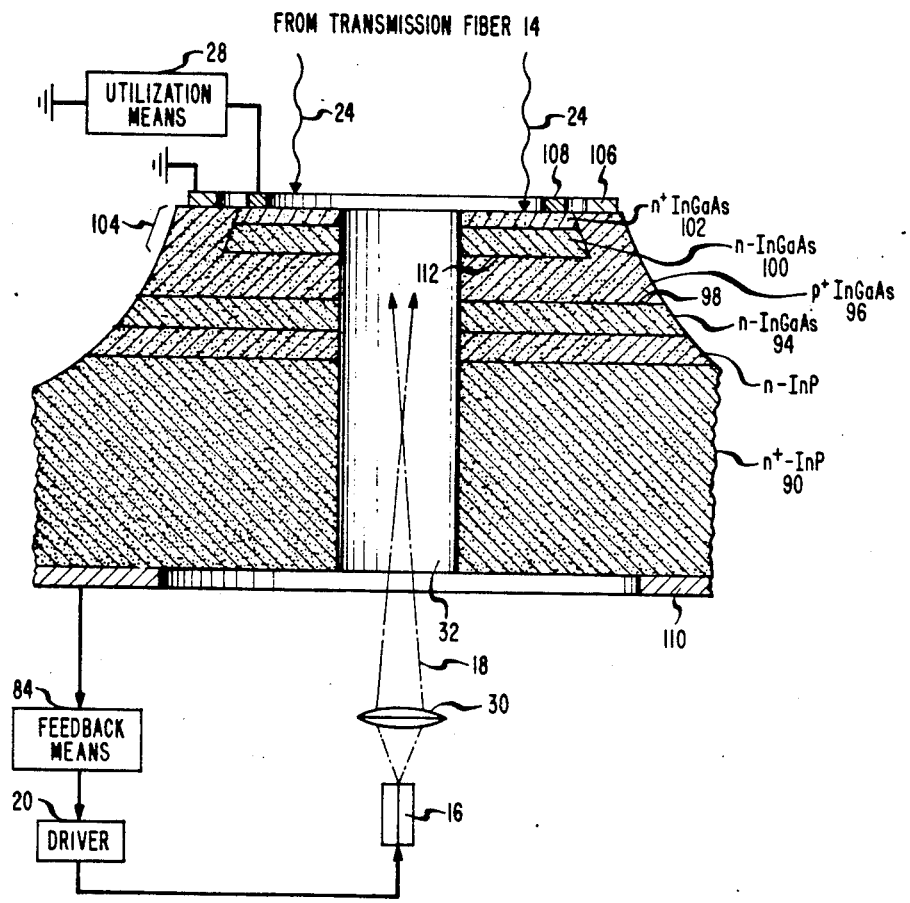
FIGS. 5 and 6 are cross-sectional views of dual photodiodes for performing both signal detection and output monitoring functions in accordance with still another aspect of our invention.
Figure 6:
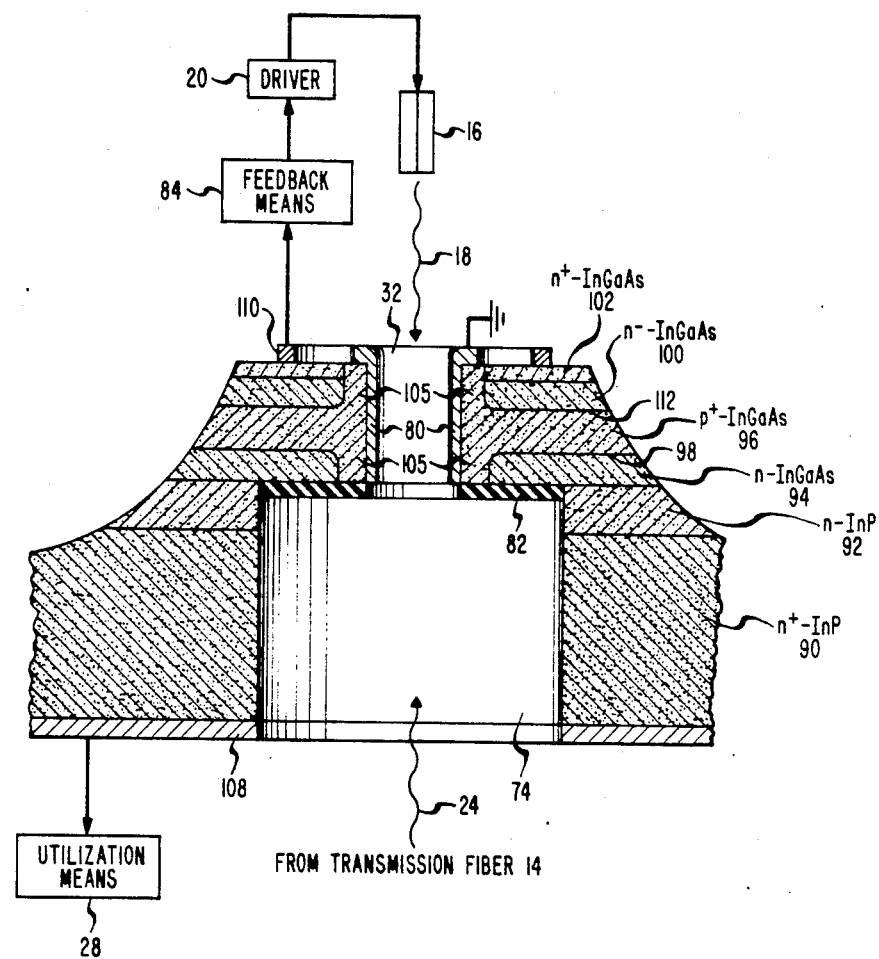

This feedback arrangement is repeated in FIGS. 5 and 6 which depict two illustrative embodiments of dual photodiodes capable of performing the monitoring and detection functions previously described.

Consider first the dual photodiode of FIG. 5. As with the photodiode of FIG. 3, the structure begins with a n+-InP substrate 90 on which are epitaxially grown an n-InP buffer layer 92 and a pair of opposite conductivity type InGaAs layers 94 and 96 which form a p-n junction 98 at the interface therebetween. The InGaAs layer 96 is p+-type whereas layer 94 is n-type. Next, two n-InGaAs layers 100 and 102 are epitaxially grown or otherwise formed on or in layer 96, thus forming a second p-n junction 112 at the interface between layers 100 and 96. Since layer 100 will ultimately form the active region of the detector photodiode, it is typically more lowly doped than layer 102. After the formation of those layers, the structure is suitably masked, and a p+-diffusion is performed to convert the exterior peripheral portions 104 of layers 100 and 102 from n-type to p-type. Using techniques well known in the art, an annular common contact 106 is formed on portion 104, an annular detector contact 108 is formed on layer 102, and an annular monitor contact 110 is formed on the substrate 90. In this fashion, the monitor photodiode between contacts 106 and 110 utilizes the p-n junction 98 to generate the feedback photocurrent from that portion of the outgoing radiation 18 which is scattered through the InP substrate and layers 90 and 92, and is absorbed in the InGaAs layers 94 and 96. On the other hand, the detector photodiode between contacts 106 and 108 utilizes p-n junction 112 at the interface between layers 100, 102, and 96. Thus, p+-InGaAs layer 96 is common to both photodiodes and, in order to reduce crosstalk, should be highly doped and made thick (e.g., $\geq 6$ μm) relative to an optical absorption length at the operating wavelength of the system.

As with the structure of FIG. 3, however, this dual photodiode configuration may, nevertheless, be subject to some crosstalk because the p-n junctions 98 and 112 intersect the sidewall of hole 32 through which the outgoing radiation 18 is focused. This problem can be alleviated utilizing the dual photodiode configuration shown in FIG. 6 which is analogous to the photodiode of FIG. 4 in that the p-n junctions 98 and 112 do not intersect the inside surface of hole 32. The layered configuration of the photodiode of FIG. 6 is substantially identical to that of FIG. 5 prior to the diffusion step. However, instead of converting the exterior perpheral portions of layers 100 and 102 from n-type to p-type as in FIG. 5, the structure is suitably masked, and diffusion takes place along the inside wall of hole 32, thereby converting from n-type to p-type the interior peripheral portions 105 of n-type layers 100 and 102. This diffusion step causes the p-n junction 98 to curve downwardly and the p-n junction 112 to curve upwardly so that neither intersects the interior wall of hole 32.

The common contact 80, the AR coating 82, and the hole 74 for the transmission fiber are formed in substantially the same way as described with reference to FIG. 4.

In contrast with FIG. 5, however, in FIG. 6 the annular detector contact 108 is formed on the substrate 90, the annular monitor contact 110 is formed on the n+-InGaAs, and the annular common contact 80 is formed on the diffused zone 105. As before, contact 80 includes a portion along the interior surface of hole 32 for further reducing crosstalk.

Thus, the detector photodiode between contacts 108 and 80 utilizes p-n junction 98 to generate a signal photocurrent in response to incoming radiation 24 absorbed in layers 94 and 96. On the other hand, the monitor photodiode between contacts 110 and 80 utilizes p-n junction 112 to generate a feedback photocurrent in response to that portion of the outgoing radiation 18 which is scattered into and absorbed by layers 102, 100, and 96.

In the following examples, various materials, dimensions, and other parameters are provided by way of illustration only and, unless otherwise stated, are not intended to limit the scope of the invention.

EXAMPLE I

This example describes the fabrication and operation of a photodiode of the type shown in FIG. 3. The layers of the photodiode were grown by liquid phase epitaxy (LPE) on a (100)-oriented n+-InP substrate 40 doped to a net carrier concentration of $\sim 10^{18}$ cm$^{-3}$. Prior to growth, the wafers were etched for three minutes at room temperature in 3-$H_2SO_4$:1-$H_2O_2$:1-$H_2O$ followed by multiple rinses with distilled and then deionized water. A 10 μm thick, unintentionally doped n-InP buffer layer 42 was first grown, followed by a 1 μm thick, unintentionally doped n-$In_{0.53}Ga_{0.47}As$ layer 44 and a 1.5 μm thick Zn-doped p+-$In_{0.53}Ga_{0.47}As$ layer 46. The doping of the n-$In_{0.53}Ga_{0.47}As$ layer 44 was $9 \times 10^{15}$ cm$^{-3}$ as determined using standard capacitance-voltage profiling techniques on the complete diodes. To process the wafers into diodes, the first step entailed electroplating Au/Zn/Au to form the top annular contact 52 and Au/Sn/Au to form the bottom annular contact 50 through photoresist masks on the surfaces of layer 46 and substrate 40, respectively. The bottom contact pattern consisted of 130 μm diameter holes in the metallization, concentric with the top annular contact 52. Next, 430 μm diameter mesas were formed using photolithography and etching in 1-Br:100-$CH_3OH$. The straight-walled holes 32 were then etched using a photoelectrochemical technique of the type described by F. W. Ostermayer and P. A. Kohl in *Applied Physics Letters*, Vol. 39, page 76 (1981), and in the aforementioned application, Ser. No. 416,472, now U. S. Pat. No. 4,414,066. Using this process, the wafer was immersed in a 0.75 N KF/0.75 N HF solution and biased such that a depletion region was formed at the semiconductor surface. When the n-InP substrate 40 was irradiated with light whose energy was greater than the InP bandgap of 1.35 eV, minority carrier holes were photogenerated. These carriers participated in the oxidation of the semiconductor, resulting in material removal from the illuminated regions. For our devices, the light was incident on the semiconductor surface through the 130 μm hole in the back contact metallization. In this manner, holes were etched whose taper was determined by diffraction and scattering of light from the bottom to the wall of the hole. Scanning electron micrographs made of the holes in our devices indicated a taper of $\sim 5$ degrees from the (100) direction. Etching proceeded until the hole extended to the p+-$In_{0.53}Ga_{0.47}As$ layer 46. For most wafers of thickness $\sim 175$ μm, this process took approximately 4 hours. The defect density in our wafers, however, enhanced minority carrier recombination which drastically slowed down the etch rate in some areas of the wafer. In other areas which were relatively free of defects, hole etching proceeded to rapid completion at the p+-layer 46, with these holes slowly widening while those in the slow etch rate area were completed. Thus, hole diameters as large as ~150 μm were measured in areas of low dislocation density.

The hole 32 was completed by etching from the mesa surface through a 125 μm diameter photolithographically defined hole mask using 1-Br:100-CH$_3$OH. This process resulted in annular diodes with a total junction area of $1.5 \times 10^{-3}$ cm$^2$. Next, excess back metal on substrate 50, which was used as a mask to the photochemical etch, was removed out to a 500 μm diameter hole defined by photoresist applied to this surface. Finally, the metal contacts were alloyed and the mesas cleaned.

The reverse dark current-voltage characteristics of the photodiodes were measured at a bias of −5 V. We found the dark current to be 90 nA, giving a current density (assuming currents flowing in the bulk of the mesa are dominant) of 60 μA/cm$^2$. This dark current is comparable with results obtained for conventional small-area detectors made from this material system.

In addition, the external quantum efficiency ($\eta$) versus wavelength was measured for illumination incident on either the mesa top or the substrate bottom. Long-wavelength cutoffs observed at $\lambda = 1.7$ μm and $\lambda = 0.92$ μm were due to the In$_{0.53}$Ga$_{0.47}$As and InP band edges, respectively. For top illumination, there was a decrease in efficiency from $\eta = 49$ percent at $\lambda = 1.6$ μm to $\eta \sim 35$ percent at $\lambda = 0.95$ μm due to absorption occurring closer to the top surface (and thus farther from the depletion region edge) as photon energy was increased. Surface recombination may also reduce $\eta$ as wavelength is decreased. In the case of back illumination, the quantum efficiency increased from $\eta = 33$ percent at $\lambda = 1.65$ μm to $\eta = 67$ percent at $\lambda = 1.05$ μm. This behavior, opposite to that observed for the front-illuminated diode, arose because the n-In$_{0.53}$Ga$_{0.47}$As layer was completely depleted at the measurement voltage (−5 V). Thus, high-energy photons ($\lambda \sim 1$ μm) were absorbed within the depletion region near the In$_{0.53}$Ga$_{0.47}$As/InP interface. However, a significant fraction of lower-energy photons ($\lambda \sim 1$.μm) were absorbed in the undepleted p+-InGaAs layer reducing their collection efficiency. The external efficiency at $\lambda = 1.3$ μm for back-illuminated diodes was $\eta = 52.8$ percent. Efficiencies as high as 70 percent are expected for diodes of this type without anti-reflection coatings for n-In$_{0.53}$Ga$_{0.47}$As layers ~2 μm thick. Finally, as mentioned above, at −5 V the n-In$_{0.53}$Ga$_{0.47}$As layer was completely depleted, giving a total device capacitance of 17.5 pF.

EXAMPLE II

Using the photodiode described in Example I, we assembled a bidirectional, single-wavelength transmission system as shown in FIG. 1 with a terminal at each end. However, because the LED 16 was an AlGaAs device operating at 0.87 μm, the photodiode of FIG. 3 was reversed so that the incoming radiation would not be absorbed by the InP substrate. That is, the LED radiation entered coupling fiber 30 from the substrate side and the transmission fiber 14 was adjacent the top of the mesa.

Coupling fiber 30 had a 50 μm core, a 125 μm O.D., and was about 2 inches long, whereas transmission fiber 14 had a step index geometry, a 200 μm core, a 250 μm O. b., and was 200 mm long (sufficient to provide adequate mode mixing). Fiber 30 was butt-coupled to both LED 16 and fiber 14.

We measured both throughput and crosstalk. The optical signal launched from one end terminal provided at the other terminal about 0.16 μA of photocurrent, which is sufficient to drive a typical receiver. However, the photocurrent would be about a factor of 7 higher had we taken our measurements at 1.3 μm where the quantum efficiency of the photodiode is that much higher. Crosstalk at one terminal was about −16.6 dB and at the other was about −12.5 dB. The difference is probably due to coupling variations, especially at the interface between the fibers. For comparison, about −10 dB of isolation at a bit rate of 32 Mb/s would be adequate for a typical digital data link.

FIBER OPTIC SENSING SYSTEMS

Figure 7:
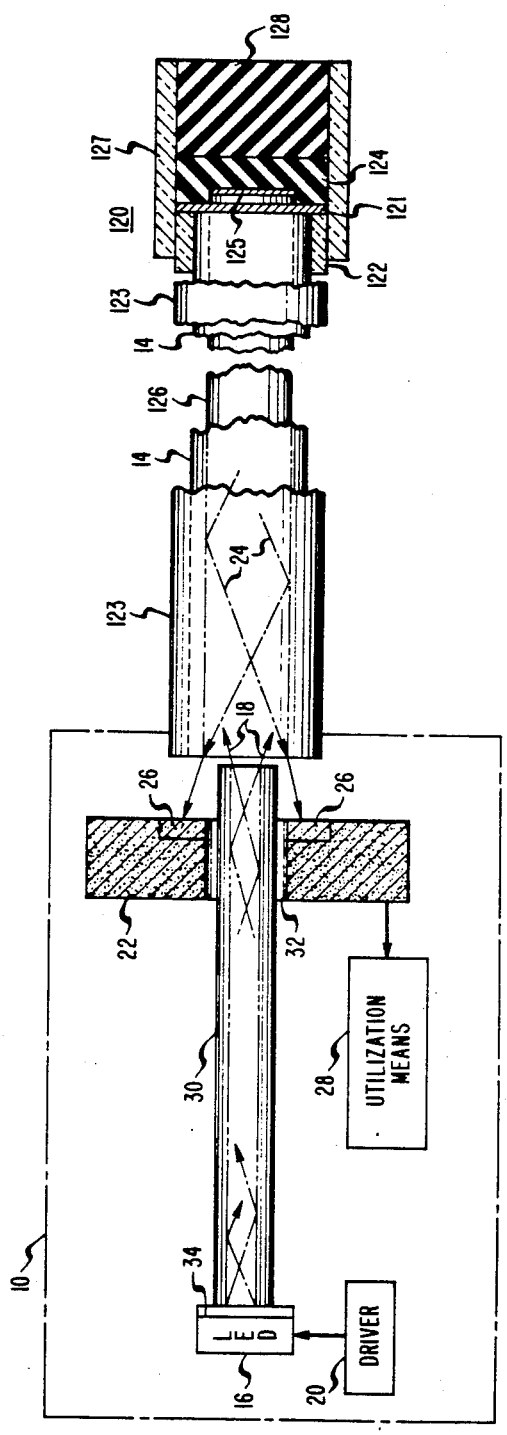
FIG. 7 is a schematic illustration of a bidirectional fiber optic sensing system in accordance with one embodiment of a still further aspect of the invention.

A further type of system which can utilize the inventive principles is shown in FIG. 7, where elements corresponding to these of FIG. 1 are similarly numbered. The major distinction in such a system is that a sensing element 120 is mounted at the end of transmission fiber 14 in place of the terminal 12 of FIG. 1. This sensor can be any type of element which reflects outgoing radiation 18 in a manner related to some external variable so that the reflected light, 24, can be used to monitor said variable. In this particular example, a blood pressure sensor is shown. However, other types of sensors which could be mounted at the fiber end include temperature, pH, oxygen concentration, and glucose sensors. Because of the small size of the fiber and sensor, they can be inserted in the human body or other types of environments to provide continuous monitoring of the appropriate variable. For example, a temperature sensor would be useful as an emission-monitoring device when inserted in the exhaust system of an automobile, airplane, etc.

The particular sensor shown here is the type described in U.S. patent application of Blonder, Lamola, and Lieberman, filed on an even date herewith, and incorporated by reference herein. Briefly, the sensor includes a partially reflecting layer, 121, such as chrome, deposited over the end of the fiber and over a hypodermic tubing, 122, which surrounds the fiber, 14, at an area from which the fiber coating, 123, has been removed. A deformable material, 124, which includes a totally reflecting element, 125, such as aluminum, on a surface of a cavity, is mounted on the layer, 121, so that the element, 125, is aligned with the fiber core, 126, and so that an air gap is formed between the reflecting elements, 121 and 125. Additional tubing, 127, is provided around the deformable material, 124, for lateral support, and a silicone material, 128, is used to fill up the space within said tubing not occupied by the remaining elements of the sensor.

Figure 8:
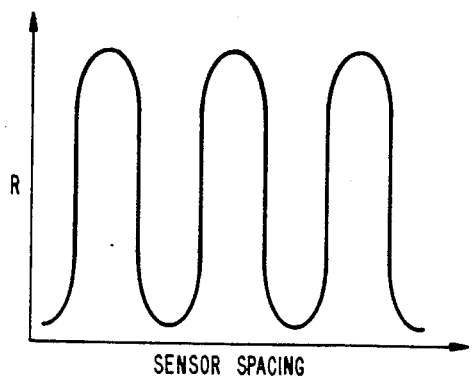
FIG. 8 is an illustration of reflected light intensity in accordance with said embodiment.
Figure 9:
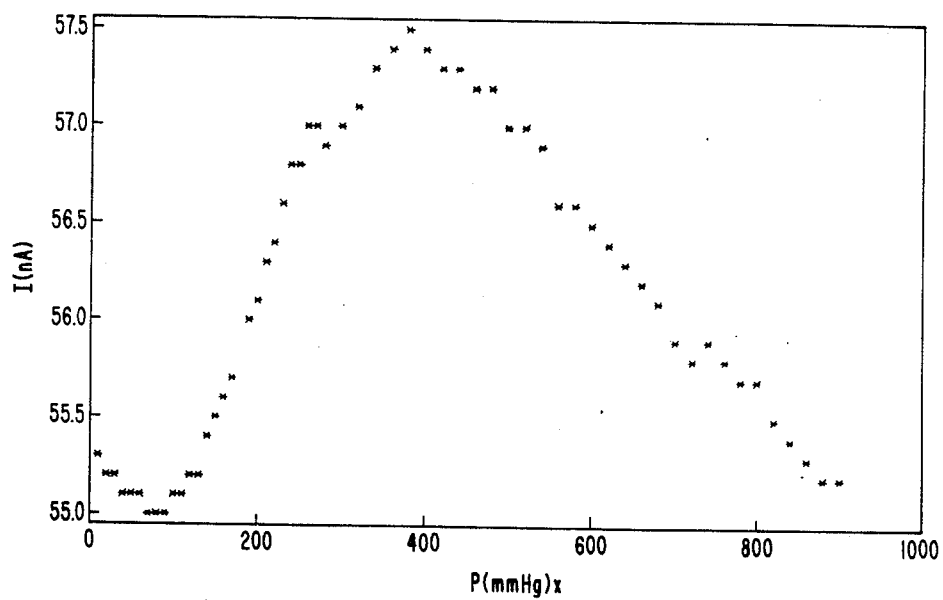
FIG. 9 is a plot of photodiode current as a function of pressure in accordance with said embodiment.

In operation, the end portion of the fiber, 14, including the sensor, 120, may be inserted in a vein or artery and light, 18, from source, 16, is transmitted through fibers, 30 and 14, to the sensing element. Layer, 121, will reflect a portion of the light, and element, 125, will reflect the remainder of the light thus establishing an interference pattern for the returning beam, 24. Because of the interference pattern, the intensity of reflected light for any particular wavelength will be a function of the separation between the elements, 121 and 125. Since element, 125, is encapsulated within flexible material, 124, this gap will vary depending upon the pressure within the vein or artery. Therefore, light intensity (R)

of beam, 24, determined by photodiode, 22, and utilization means, 28, will have a characteristic of the type shown in FIG. 8 where reflected light intensity is a periodic function of the gap between sensor elements, 121 and 125. By monitoring the change in intensity in the light incident on photodiode 22, the blood pressure can therefore be continuously monitored. An actual plot of photodetector current, I, as a function of pressure, P, is shown in FIG. 9.

It will be appreciated that the fiber optic sensor systems may also utilize edge-emitting light sources and therefore have the general configuration shown in FIG. 2, with the sensor replacing the terminal, 12, at the end of the fiber.

It will also be appreciated that the fiber optic sensing systems may utilize the appropriate photodiode configurations shown in FIGS. 3-6 or other structures.

Figure 10:
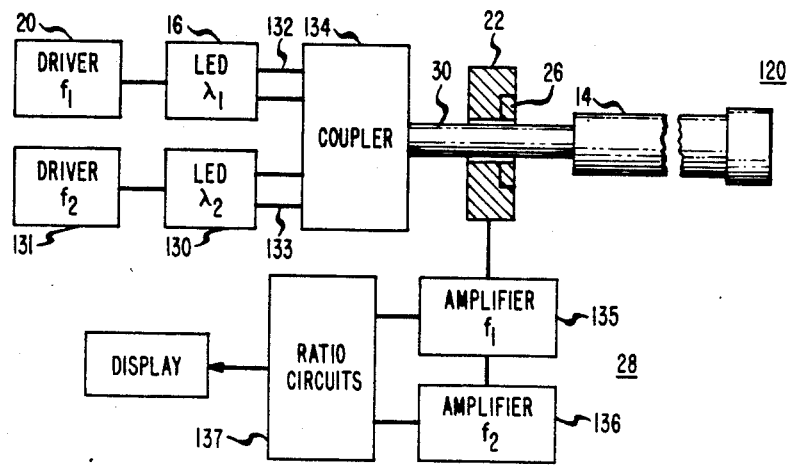
FIG. 10 is a schematic illustration of a fiber optic sensing system in accordance with a further embodiment of said aspect of the invention.

A further embodiment of a fiber optic sensing system may also utilize more than one wavelength of light. One such typical system is shown schematically in FIG. 10, again with components corresponding to previous embodiments similarly numbered. Here, two light-emitting diodes, 16 and 130, are utilized as sources emitting light at different wavelength ($\lambda_1$ and $\lambda_2$, respectively). The LEDs are also powered by separate drivers, 20 and 131, operating at different frequencies ($f_1$ and $f_2$). The light from the sources, 16 and 130, is coupled by means of fibers, 132 and 133, to a standard optical coupler, 134, which in turn couples the light into fibers, 30. In this particular example, the incoming light from both sources is combined and sent simultaneously through the fiber, 30, as in a standard frequency multiplexing system. If desired, a time division multiplexed system could be employed by appropriately gating the drivers and detection amplifier.

The combined light is sent through fiber, 14, and made incident on sensor, 120. The wavelengths are such that the element, 121 (FIG. 7) will partially reflect one wavelength (e.g., $\lambda_1$) as before, but totally reflect the other wavelength (e.g, $\lambda_2$). The element, 125, will totally reflect the remaining portion of the one wavelength ($\lambda_1$) which passed through element, 121. The reflected light detected by photodiode, 22, will therefore comprise the interference pattern of light at wavelength, $\lambda_1$, and the light at wavelength $\lambda_2$, which has no interferometric characteristic. Each wavelength component can be separately amplified by one of amplifiers, 135 and 136, which are constructed to operate at the modulation frequency ($f_1$ and $f_2$, respectively) of a particular component. The ratio of the intensity of the two amplified signals can then be achieved by standard ratio circuitry, 137, and the output displayed.

Figure 11:
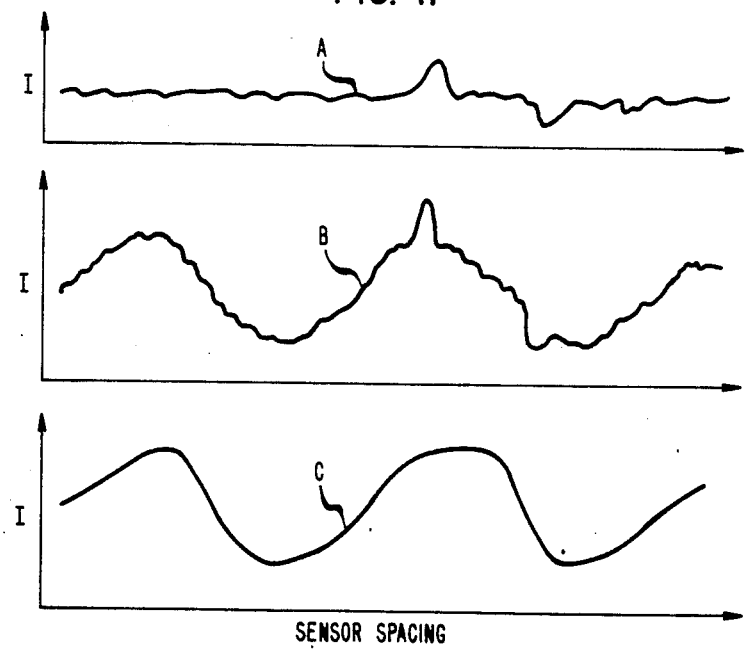
FIG. 11 is an illustration of photodiode current intensities in accordance with said further embodiment.

A rough approximation of the displayed signals from such a system is illustrated in FIG. 11. All three curves show photocurrent intensity as a function of the spacing of sensor elements, 121 and 125. Curve A shows the characteristic of the light totally reflected by element, 121, and therefore is constant except for noise in the system. Curve B is the characteristic of the light reflected by both elements, 121 and 125, and so basically corresponds to the periodic curve illustrated in FIG. 8, with the same nosie added. By taking the ratio of the two signals, curve C, the noise in the combined signal can therefore be reduced.

It will be appreciated that these fiber optic sensor systems may include many other means for monitoring the reflected light signal. For example, a plurality of source using different wavelengths can be used as in the system of FIG. 10 but with each source wavelength being partially and totally reflected by the sensor so that a reflectivity curve would be produced as a function of wavelength. This reflectivity curve will shift as the spacing between reflecting elements, 121 and 125, changes. Pressure (or whatever variable is being measured) could then be monitored by monitoring the shift in the reflectivity curve.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, although our photodiodes have been described with specific reference to InP/InGaAs materials, it is apparent that, depending on the wavelength of operation, other lattice-matched Group III-V compounds are also suitable; e.g., GaAs/AlGaAs; InP/InGaAsP; GaSb/GaAlAsSb. In addition, the p-i-n photodiode of FIG. 3 can be converted to an APD by substituting a p+-InP layer for the p+-InGaAs layer and by growing an n-InP layer of appropriate doping and thickness known in the art between the p+-InP layer and the n-InGaAs layer.

Moreover, the photodiodes described herein, besides being suitable for the detection and monitoring functions described, are also useful in other applications; e.g., for backscattering detection in optical disc memory reading function; as a fiber tap; and as a laser monitor for unidirectional transmission systems.

Finally, the transmission fiber, 14, may include at each end a fiber segment, commonly referred to as a pigtail, which is a permanent component of each transceiver and which is coupled to the fiber, 14, via a suitable connector.

It will be understood in the context of this application that the term "backscattered" means reflected back toward the source of light.

What is claimed is:

1. For use in a bidirectional backscattering detection system in which outgoing and backscattered radiation is transmitted over a transmission fiber, a transceiver comprising:
   a semiconductor light-emitting device having a p-n junction for generating said outgoing radiation essentially parallel to said junction,
   a photodiode having a first active region of a first diameter and a first hole of a smaller second diameter extending through said photodiode in said first active region, said first active region being responsive to said backscattered radiation for generating a signal photocurrent,
   means for coupling said outgoing radiation through said first hole, and
   a segment of said transmission fiber having a diameter much larger than that of said first hole and having one end positioned adjacent said first active region so that said outgoing radiation is coupled through said first hole into said transmission fiber segment and said backscattered radiation diverges from one end of said transmission fiber segment and is detected by said first active region to produce said signal photocurrent, said first hole being sufficiently small relative to said first active region so that an insignificant portion of said backscattered radiation is coupled through said first hole, and said coupling means comprises lens means effective to focus said outgoing radiation from said source to a point that lies approximately centrally within said first hole of said photodiode.

2. For use in a bidirectional backscattering detection system in which outgoing and backscattered radiation occurs over a transmission fiber, a transceiver comprising:

a surface-emitting LED having a p-n junction for generating said outgoing radiation essentially perpendicular to said junction, a photodiode having an active region of a first diameter and a hole of a smaller second diameter extending through said photodiode in said active region, said active region being responsive to said backscattered radiation for generating a signal photocurrent, means for coupling said outgoing radiation through said hole, and a segment of said transmission fiber having a diameter much larger than that of said hole and having one end positioned adjacent said active region so that said outgoing radiation is coupled through said hole into said transmission fiber segment and said backscattered radiation diverges from one end of said transmission fiber segment and is detected by said active region to produce said signal photocurrent, said hole being sufficiently small relative to said active region so that an insignificant portion of said backscattered radiation is coupled through said hole, said coupling means comprising a coupling fiber which extends through said hole in said photodiode, one end of said coupling fiber being butt-coupled to said LED and the other end of said coupling fiber being butt-coupled to said transmission fiber segment, the diameter of said coupling fiber being much smaller than the diameter of said transmission fiber segment so that essentially all of said outgoing radiation is coupled from said LED into said transmission fiber segment, and so that an insignificant portion of said backscattered radiation is coupled from said transmission fiber segment into said coupling fiber.

3. A bidirectional fiber optic sensing system comprising:

an optical transmission fiber;

a sensing element located at one end of said transmission fiber, said sensing element being adapted to reflect light in a manner related to an external variable to permit monitoring of said external variable; and a transceiver coupled to the opposite end of said transmission fiber for transmission of outgoing radiation and detection of reflected radiation from said sensing element;

said transceiver including at least one semiconductor light-emitting device for generating said outgoing radiation;

said transceiver further including a photodiode having an active region of a first diameter and a first hole of a smaller second diameter extending through said photodiode in said active region, said active region being responsive to said reflected radiation for generating a signal photocurrent, and means for coupling said outgoing radiation through said first hole;

said transmission fiber being adapted to mix the modes of the radiation propagating therein, having a diameter much larger than that of said first hole, and hving one end positioned adjacent said active region so that said outgoing radiation is coupled through said first hole into said transmission fiber and said reflected radiation diverges from one end of said transmission fiber and is detected by said active region to produce said signal photocurrent, said first hole being sufficiently small relative to said active region so that an insignificant portion of said reflected radiation is coupled through said first hole.

4. The system according to claim 3 wherein said transceiver comprises a plurality of light-emitting devices generating light of different wavelengths.

5. The system according to claim 4 further comprising means for forming the ratio of the signal photocurrents produced by the photodiode in response to the light of different wavelengths.

6. The system according to claim 5 further comprising means for frequency multiplexing the light from the plurality of light emitting devices into the transmission fiber.

7. The system according to claim 5 further comprising means for time division multiplexing the light from the plurality of light emitting devices into the transmission fiber.

8. The system according to claim 3 wherein the sensing element is adapted to reflect light in a manner related to external pressure on the element.

* * * * *